(12) United States Patent  (10) Patent No.: US 8,713,796 B2
Daut  (45) Date of Patent: May 6, 2014

(54) METHOD FOR PRODUCING A FLAT TUBE WITH AN INNER INSERT

(75) Inventor: Ingo Daut, Oberboihingen (DE)

(73) Assignee: Modine Manufacturing Company, Racine, WI (US)

( * ) Notice: Subject to any disclaimer, the term of this patent is extended or adjusted under 35 U.S.C. 154(b) by 873 days.

(21) Appl. No.: 12/867,893

(22) PCT Filed: Jan. 16, 2009

(86) PCT No.: PCT/EP2009/000233
§ 371 (c)(1),
(2), (4) Date: Aug. 17, 2010

(87) PCT Pub. No.: WO2009/103385
PCT Pub. Date: Aug. 27, 2009

(65) Prior Publication Data
US 2011/0000656 A1 Jan. 6, 2011

(30) Foreign Application Priority Data

Feb. 20, 2008 (DE) .......................... 10 2008 010 187

(51) Int. Cl.
B21D 53/04 (2006.01)
B21D 53/02 (2006.01)
B23P 15/26 (2006.01)

(52) U.S. Cl.
USPC ............. 29/890.049; 29/590.054; 29/890.053

(58) Field of Classification Search
CPC ........ B21D 53/04; B21D 53/02; B21D 39/02; B21D 53/06; B21D 19/08; B21P 15/26
USPC ...................... 29/890.049, 890.046, 890.045, 29/890.053, 890.054
See application file for complete search history.

(56) References Cited

U.S. PATENT DOCUMENTS 4,595,135 A * 6/1986 Wallis ............................. 228/17
4,971,240 A * 11/1990 Wallis ........................... 228/146
(Continued)

FOREIGN PATENT DOCUMENTS

DE  4417524  11/1995
DE  19645928  5/1998
(Continued)

OTHER PUBLICATIONS

Notification of Decision of Rejection for Chinese Application No. 200980113874.5 dated Jul. 15, 2013 (12 pages).

(Continued)

Primary Examiner — David Bryant
Assistant Examiner — Jason L Vaughan
(74) Attorney, Agent, or Firm — Michael Best & Friedrich LLP

(57) ABSTRACT

A flat tube for use with a heat exchanger. The flat tube including wide sides, narrow sides, an inner insert, a wall that at least partially forms the wide sides and the narrow sides, and the wall is configured to be produced from a punched-out blank. The flat tube further includes an introduction bevel in order to facilitate introduction of the inner insert. The introduction bevel includes at least two bent-down projections at an end of the flat tube. The at least two projections extend over portions of at least one of the wide sides and the narrow sides, and it being possible for the at least two projections to be separated off after the introduction of the inner insert.

8 Claims, 4 Drawing Sheets

(56) References Cited

U.S. PATENT DOCUMENTS

| | | | |
|---|---|---|---|
| 5,295,302 A * | 3/1994 | Takai et al. | 29/890.039 |
| 5,456,006 A * | 10/1995 | Study | 29/890.049 |
| 6,276,513 B1 * | 8/2001 | Asano et al. | 198/406 |
| 6,286,201 B1 * | 9/2001 | Prater et al. | 29/727 |
| 6,398,482 B2 * | 6/2002 | Asano et al. | 414/799 |
| 6,412,174 B1 * | 7/2002 | Kawano et al. | 29/890.053 |
| 6,418,614 B2 * | 7/2002 | Akutsu et al. | 29/727 |
| 6,423,423 B2 * | 7/2002 | Akutsu et al. | 428/577 |
| 6,453,711 B2 * | 9/2002 | Rhodes et al. | 72/180 |
| 6,470,570 B2 * | 10/2002 | Prater et al. | 29/890.053 |
| 6,539,628 B2 * | 4/2003 | Akutsu et al. | 29/890.049 |
| 6,571,473 B1 * | 6/2003 | Nozaki et al. | 29/890.049 |
| 6,783,056 B2 * | 8/2004 | Kouno et al. | 228/183 |
| 7,886,440 B2 * | 2/2011 | Hashimoto et al. | 29/890.049 |
| 2001/0053457 A1 * | 12/2001 | Akutsu et al. | 428/577 |
| 2007/0095514 A1 * | 5/2007 | Inoue et al. | 165/177 |

FOREIGN PATENT DOCUMENTS

| | | | |
|---|---|---|---|
| DE | 19927607 | | 12/2000 |
| DE | 10241634 | | 10/2003 |
| DE | 102004053892 | | 5/2006 |
| GB | 581038 | | 9/1946 |
| GB | 782631 | | 9/1957 |
| JP | 05115934 A | * | 5/1993 ............ B21D 53/06 |
| JP | 05115934 A1 | | 5/1993 |
| WO | 2007/031306 | | 3/2007 |

OTHER PUBLICATIONS

PCT/EP2009/000233 International Preliminary Report on Patentability dated Sep. 16, 2010 (8 pages).

Office Action from the State Intellectual Property Office of the People's Republic of China for Application No. 200980113874.5 dated Aug. 31, 2012 (English Translation and Original, 14 pages).

International Search Report for PCT/EP2009/000233, dated May 11, 2009, 4 pages.

International Written Opinion for PCT/EP2009/000233, dated May 11, 2009, 6 pages.

German Search Report for 102008010187.7, dated Jul. 31, 2008, 4 pages.

\* cited by examiner

FIG. 3
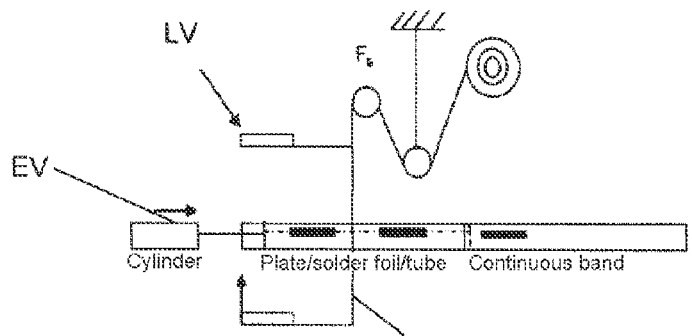
FIG. 4
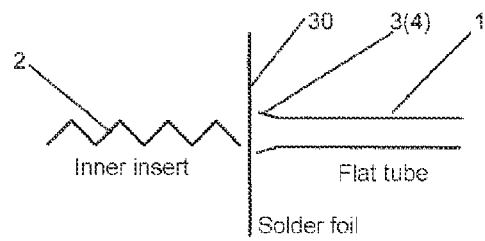
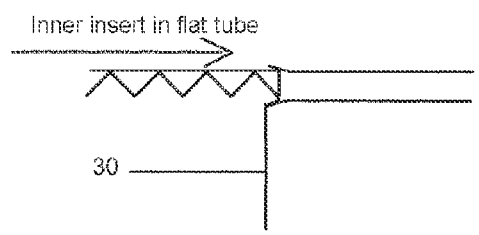
FIG. 5
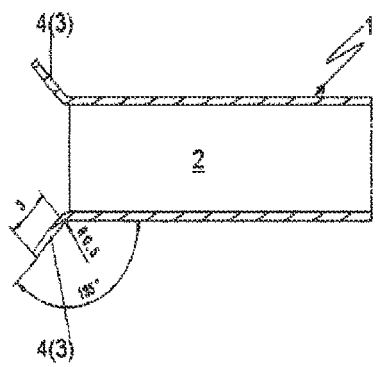
FIG. 6
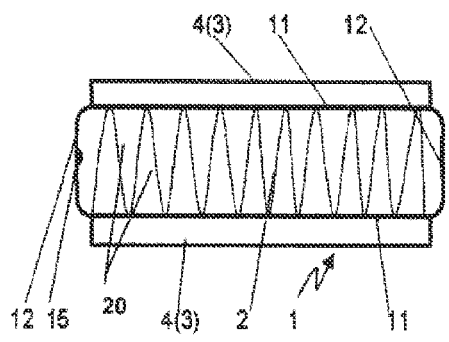

METHOD FOR PRODUCING A FLAT TUBE WITH AN INNER INSERT

RELATED APPLICATIONS

This application claims priority from German Patent Application No. 10 2008 010 187.7, filed Feb. 20, 2008, and PCT Application No. PCT/EP2009/000233, filed Jan. 16, 2009, both of which are incorporated by reference herein.

BACKGROUND

The invention relates to a flat tube for heat exchangers with wide and narrow sides and an inner insert and with an introduction bevel in order to facilitate introduction of the inner insert. The invention also relates to a method (and installation) for producing flat tubes for heat exchangers.

The heat exchanger described in DE 199 27 607 A1 has flat tubes. In said publication, the known heat exchanger has been embodied specifically as a charge air cooler and therefore consists of aluminum sheets. The ends of the flat tubes were widened, the widened ends tightly abutting one another in a stack of flat tubes. The mutually abutting, end-side widenings also produce, in an advantageous manner between the flat tubes, channels through which a coolant can flow. Accordingly, the publication makes provision to dispense with the use of tube bottoms. The widenings of the flat tube ends are directly connected and an air box is arranged around the end-side circumference of the stack. The widenings have the positive side effect that the introduction of the inner inserts into the flat tubes is easier to bring about, as the widenings serve as introduction bevels. Nevertheless, the production of the flat tubes provided with the widenings is regarded as being very costly. In addition, soldering-related problems arise both in the tight connection of the widenings of the flat tube ends to one another and in the connection of the box to the aforementioned circumference of the stack of flat tubes. Furthermore, widenings often lead to a certain reduction in wall thickness, associated with the risk of the wall becoming torn down. It is therefore not possible to use such low wall or metal sheet thicknesses as would actually be desirable for reasons of weight and cost.

In other known solutions which dispense with the widening of the flat tube ends or with introduction bevels, the flat tube is usually continuously produced from the band on a rolling train or the like and cut to length. The flat tube is then deformed in the resilient region, that is to say brought in the direction of a slightly elliptical cross section, in order to facilitate the introduction of the inner insert. Owing to the later soldering, the tolerances of the inner inserts and the flat tubes have to be very close to one another; this compounds the difficulties. Such solutions are often also not quality-responsive, because the wall of the flat tubes does not automatically nestle snug against the inner inserts again after the inner inserts have been inserted. In order to achieve quality-responsive solderings, the wall has to be pressed flat against the inner inserts, wherein the narrow sides of the flat tubes can be deformed in an undefined manner, leading later to further problems when connecting the flat tube ends in openings of a tube bottom by soldering.

Possibly the most perfect known method for producing flat tubes with inner inserts from band material is distinguished in that both the flat tube and the inner insert are produced from endless bands on a rolling train or the like. In this case, over the course of the reshaping of the band into the flat tube shape, the inner insert, which has already been reshaped, is threaded into the flat tube and the reshaping of the flat tube is concluded. This method thus dispenses with the introduction of individual inner inserts into individual flat tubes altogether. However, it does present a few difficulties in the clean separating-off of individual flat tubes along with the inner insert from the endless flat tube. The enormous investment costs for implementing this method make it uneconomical when demand does not allow extensive large-scale production of flat tubes of equal dimensions. As an example of this known method, reference may be made to JP 05-115934 A.

Finally, for the production of flat tubes for heat exchangers, it is also known to punch out blanks, to reshape the blanks into the flat tube and to weld them in a longitudinal seam (see DE 196 45 928 A). The inner inserts can also be introduced into flat tubes produced in this way; however, this is associated with the above-described difficulties.

SUMMARY

The object of the invention is to develop the above-outlined manner of producing flat tubes in such a way as to allow the described costly widening of the flat tube ends to be dispensed with without substantially impeding the introduction of the inner inserts.

According to the method according to the invention, provision is made for two projections to be generated at at least one flat tube end and for the projections to be bent down outwards.

Because the wall of the flat tube as the blank is provided preferably with at least two projections, because the blank is reshaped into the flat tube in such a way that the projections form at least parts of the wide sides or narrow sides of at least one flat tube end, because the projections are bent down to form introduction bevels, and the inner inserts are inserted into the flat tube, the introduction of the inner inserts can be carried out without the provision of widenings. The bent-down projections perform the function of introduction bevels. As the projections are, according to a highly preferred aspect, separated off after the insertion, the flat tube ends can be inserted into openings of tube bottoms and tightly connected with much higher process safety. In addition, because the cutting-off is carried out from the outside inwards, the flat tube ends will be inwardly deformed slightly conically, thereby likewise facilitating the aforementioned insertion into the openings.

Comparable advantages are achieved in that the wall of the flat tube is provided as a blank, in that the blank is reshaped into the flat tube and the seam is produced, in that, at at least one flat tube end, the narrow sides are cut out down to a shallow depth, just a few millimeters may be sufficient, in that at least parts of the wide sides are left as projections which are bent down, in that the inner inserts are inserted into the flat tube and the projections are afterwards cut off. This variant of the method differs from other variants in that the projections are not already produced in the blank but are created only as a result of the cutting-out of the narrow sides, after the production of the flat tube but before the introduction of the inner insert.

A further advantage of the proposed method consists in the fact that the required investment costs are much lower than, for example, those for a rolling train for the continuous production of flat tubes. The proposed method is thus an outstanding alternative to the prior art.

The flat tube according to the invention for heat exchangers with wide and narrow sides and an inner insert, the wall of which can be produced from a punched-out blank, the flat tube having an introduction bevel in order to facilitate introduction of the inner insert, is characterized in that the introduction bevel consists of at least two bent-down projections at the end of the flat tube, the projections extending over portions of the wide sides and/or narrow sides of the flat tube.

It has been found that the introduction bevels, which are embodied as proposed as projections, allow the inner inserts to be introduced in a high-quality manner. The tube wall nestles snug against the inner insert after the introduction. A sheet metal reshaping installation, which is suitable for carrying out a few steps of the method, forms the subject matter of one aspect of the invention. The installation differs from the prior art in particular in that it contains a device for bending down the projections.

In addition, these features and the advantages thereof will emerge from the following description of exemplary embodiments given with reference to the appended drawings.

BRIEF DESCRIPTION OF THE DRAWINGS

FIGS. 3 and 4 show in principle the insertion of inner inserts into flat tubes;
FIG. 5 is a longitudinal section through a flat tube end and FIG. 6 is a sketched view onto a flat tube end.

DETAILED DESCRIPTION

Figure 1:
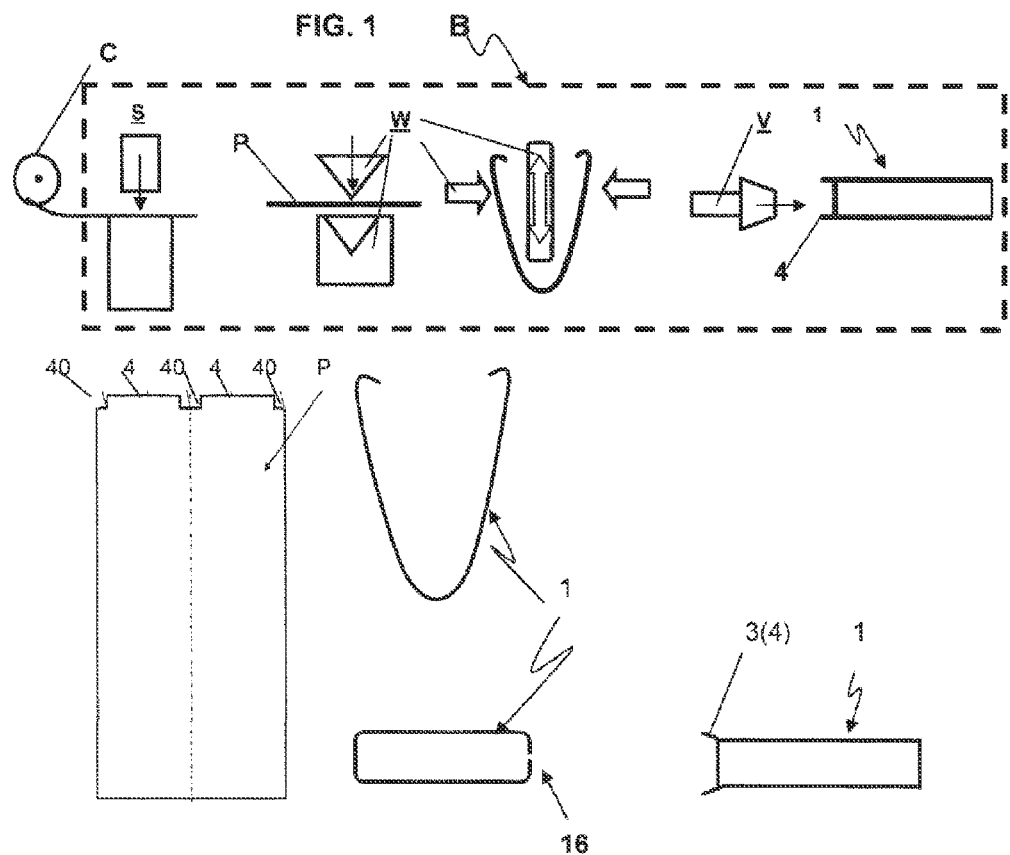
FIG. 1 shows the production sequence for flat tubes (principle)

The flat tubes 1 which will be described hereinafter in the exemplary embodiments and have inner inserts 2 are intended for waste gas heat exchangers. The flat tubes 1 and the inner inserts 2 are therefore made of high-grade steel sheets. As there is provided, over the course of the process for producing the waste gas heat exchanger, a soldering method in which the inner inserts 2 are also to be soldered into the flat tubes 1, it will also be described how soldering foils 30 are introduced into the flat tube 1, between the inner insert 2 and the inner side of the flat tube wall. As is known, solder coating has to date not yet been solved or is at least difficult in high-grade steel sheets.

In aluminum sheets, which have gained acceptance, in various alloy compositions, as the standard material for producing other heat exchangers in the automotive sector, solder coating of the sheets is conventional, so solder foils are not necessary there. The present proposal also includes embodiments in which solder foils are not necessary because a solder coating is present.

The initial sheet metal strip is in the form of an endless band made of high-grade steel sheet. A required piece of metal sheet is withdrawn cyclically from this coil C and supplied to a punch S. The blank P produced in the punching tool is the tube wall of the subsequent flat tube. In the preferred case (FIG. 1), the blank P has two projections 4 at one end. This one end is also the subsequent one end of the flat tube 1. Projections 4 of this type are not necessarily required at the other end of the blank P or the flat tube. They would in any case mean additional expense. In the case shown, the two projections 4 extend roughly over both wide sides 11. The three cutouts 40 are accordingly positioned roughly in the subsequent narrow sides 12 of the flat tube 1. It would also be possible to provide more than two projections 4 with a corresponding plurality of cutouts 40. The blank P leaves the punching tool and can be supplied to a further device in which the flat tube shape is produced. The flat tube 1 is produced with a minimized welding gap 16 in a narrow side 12. Subsequently, the projections 4 can be bent down by means of a bending tool. The bending angle may therefore be about 35 degrees to 45 degrees (FIG. 5). The flat tube with the bent-down projections 4 is transported to a further device.

Figure 2:
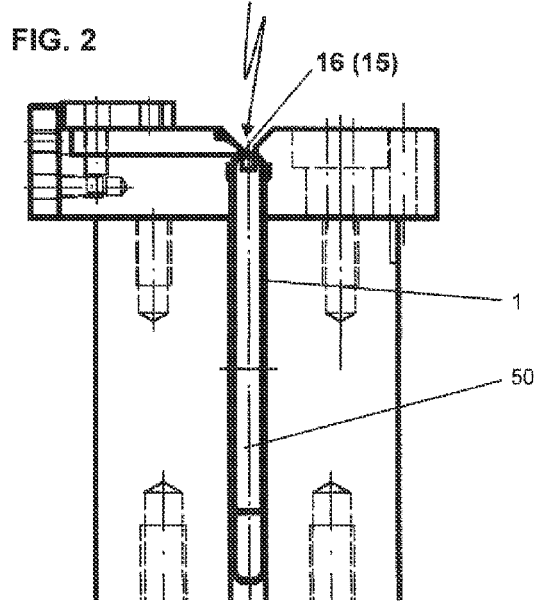
FIG. 2 shows the welding of the flat tube (principle)

In some embodiments, the aforementioned punch S or press has been expanded into a more complex sheet metal reshaping installation B (framed in FIG. 1) from which the reshaped flat tubes 1 with the bent-down projections 4 issue cyclically. The sheet metal reshaping installation B contains at least one tool W for producing the flat tube shape from the blank P. In other words, in the preferred embodiment, the projections 4 are bent down as early as during the course of the production of the flat tube shape, that is to say before the welding of the longitudinal seam. Complex sheet metal reshaping installations of this type are known per se, that is to say apart from the device V integrated therein for bending over the projections 4. During the bending-over of the projections 4, the flat tube 1 may still be clamped in the tool W. In this state, the device V approaches one end of the flat tube 1 and carries out the bending process. The respectively reached machining state of the flat tube was sketched in FIG. 1 below the stations S, W and V. In this case, the flat tube 1 is subsequently transported to a welding station (FIG. 2). A weld backing 50 is introduced into the flat tube 1 and, in one of the narrow sides 12 of the flat tube 1, a weld seam 15 is formed in the longitudinal direction of the flat tube 1. The seam may be a seam which is welded using a laser. In this case, the flat tube is held between clamping jaws.

On a second transportation section, inner inserts 2, likewise originating from an endless band, are reshaped accordingly, that is to say provided with a wave structure, cut to length and advanced to a further device. An inner insert 2 is inserted into each flat tube 1 by means of this device EV. The flat tube 1 is for this purpose oriented in such a way that it comes to lie with its bent-down projections 4, which serve as introduction bevels 3, in the direction of an arriving inner insert 2. The inner insert 2 is advanced to the end of the flat tube 1 and slid into the flat tube 1. FIG. 6 is a view onto a flat tube end showing the state now reached.

Nevertheless, as was stated at the outset concerning this portion, the flat tubes 1 and inner inserts 2 are made of high-grade steel in the exemplary embodiment shown. A solder foil device LV is therefore also operatively connected to the further device, i.e. to the insertion device EV. A piece of solder foil 30 of the required length is separated off from an endless solder foil band by means of the solder foil device LV and brought up to the inner insert 2 before the inner insert is inserted, so that the solder foil 30 rests against the inner insert 2 at the top and bottom. Only then is the inner insert 2 inserted along with the solder foil 30 (FIGS. 3 and 4). The three illustrations in FIG. 4 indicate (from top to bottom) how the solder foil 30 is brought before the inner insert 2 in order to be placed around the inner insert and how, finally, the solder foil 30 is slid with the inner insert 2 into the flat tube 1. The wavy inner insert 2 can have meandering channels 20 running in the longitudinal direction of the flat tube 1; the sketched illustration of the inner insert 2 in FIG. 4 is intended to clarify this. FIGS. 5 and 6 show the state which has now been reached.

Figure 7:
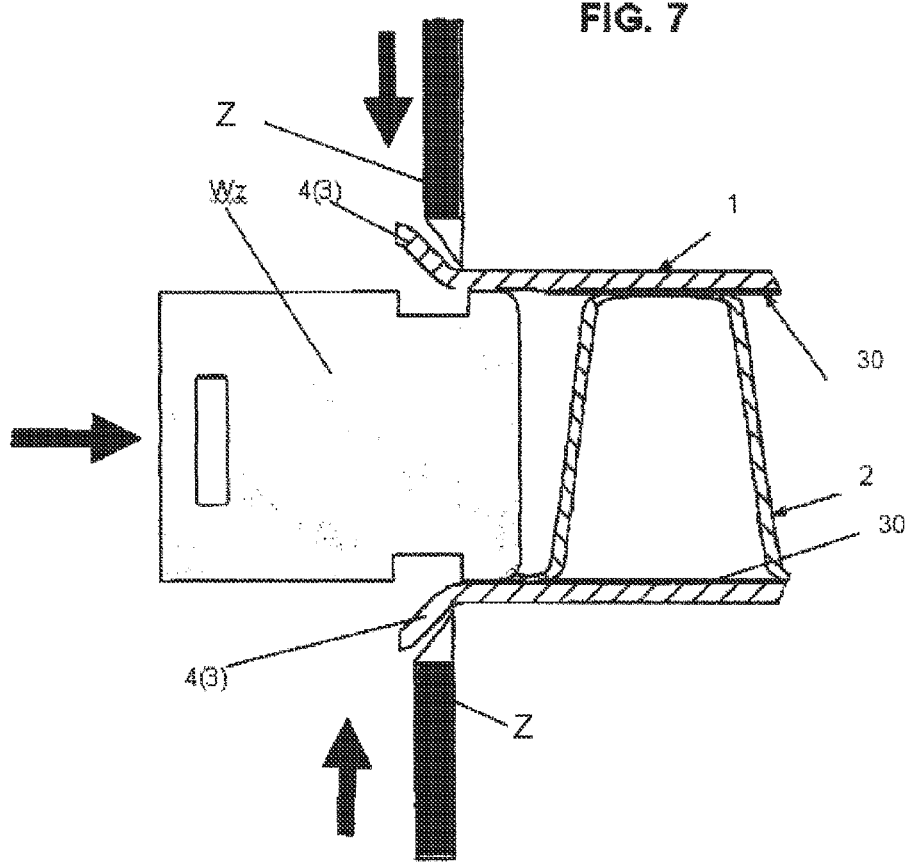
FIG. 7 shows a flat tube end over the course of the separating-off of the projections.

Subsequently, the individual flat tubes 1 with the inner inserts 2 arranged therein are transported to a separating-off device in which the two bent-down projections 4 are removed. For this purpose, as FIG. 7 shows by way of example, a tool Wz is introduced into the flat tube end in order to support it and subsequently the two projections 4 are cut off by means of externally acting cutting blades Z.

Figure 8:
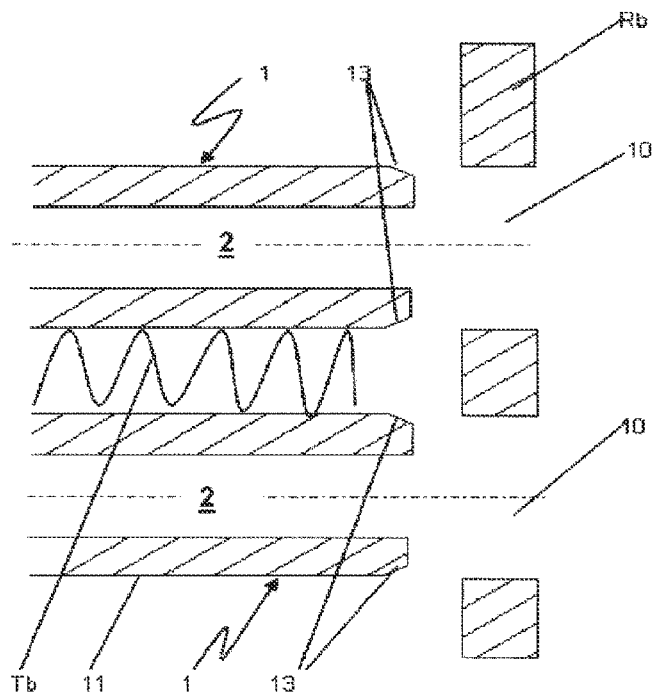
FIG. 8 shows a detail from a heat exchanger.
Figure 9:
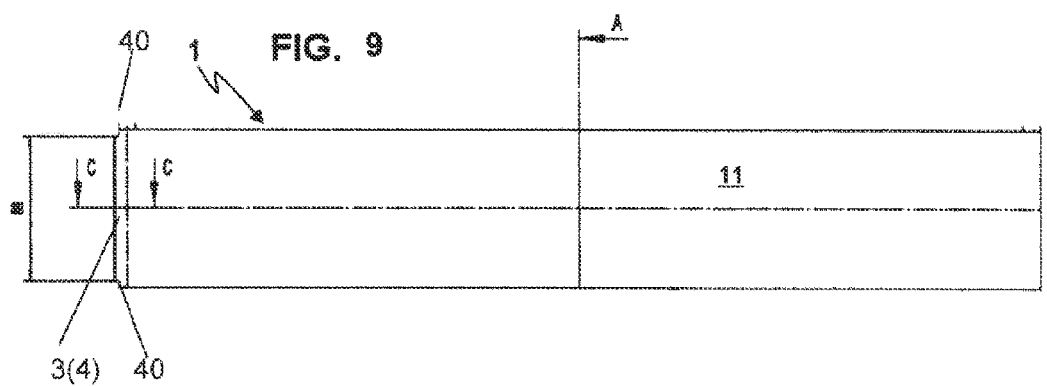
FIG. 9 is a plan view onto a flat tube.

Afterwards, the flat tubes 1, which are equipped with inner inserts 2, are stacked in alternation with baffle sheets Tb. Tube bottoms are attached to the ends of the flat tubes. The cooling network which has now been produced can be soldered in a soldering furnace under vacuum, for which purpose a contact pressure is applied to the cooling network over the surface area thereof. FIG. 8 shows a small detail of a heat exchanger consisting of just two flat tube ends and a tube bottom Rb with openings 10 into which the flat tube ends are to be inserted. It may be seen from this that the separating-off of the bent-down projections 4 has formed an external chamfer 13 which somewhat facilitates the insertion of the flat tube ends into the openings 10.

Necessary pretreatments with respect to soldering, for example degreasing, etc., will not be described because it may be assumed that the person skilled in the art is familiar with these.

A housing can now be arranged around the soldered cooling network. The housing can be welded to the edges of the tube bottoms. Furthermore, collecting boxes can be attached and likewise welded to the tube bottoms. Plastics material collecting boxes, which are mechanically connected to the edges of the tube bottom, are also possible depending on the prevailing temperatures. Nevertheless, if the collecting boxes are also made of metal, it may be more beneficial to attach the housing and the collecting boxes to the cooling network even before the cooling network is soldered and only then to solder the entire heat exchanger in the soldering furnace. As the housing is not in contact with the aggressive waste gases, it may for example be made of aluminum or of ferritic steel. A variant of the flat tube production that is feasible but not shown consists in punching out the blank P without the aforementioned projections 4. After the above-described welding of the flat tube, both narrow sides 12 of the flat tube 1 are cut out so as to be about 4 mm deep or wide at one end of the flat tube. Subsequently, the wide sides 11 are bent down outwards, for example to 45 degrees. The cutting-out and the bending-down can also be carried out in one operation by means of a common tool. In an alternative the wide sides are cut out and the narrow sides are bent over outwards. The subsequent operations correspond to those described hereinbefore.

The invention claimed is:

1. A method for producing a flat tube with an inner insert for use in a heat exchanger, the method comprising:

produce a blank from a sheet metal strip, the blank forming a wall of the flat tube;

generating at least two projections in the blank;

reshaping the blank into the flat tube having narrow sides, wide sides, and a seam;

joining the flat tube at the seam;

bending the at least two projections down and outward so that introduction bevels are provided for inserting the inner insert into the flat tube;

inserting the inner insert into the flat tube after the joining of the flat tube at the seam; and removing the at least two projections from the flat tube after inserting the inner insert.

2. The method according to claim 1, wherein generating the at least two projections includes punching out the blank, and wherein reshaping the blank includes reshaping the blank in such a way that the at least two projections form at least part of one of the wide sides and the narrow side.

3. The method according to claim 1, wherein generating the at least two projections includes cutting out the narrow sides.

4. The method according to claims 1, wherein the seam is a weld seam, the method further comprising:

introducing a weld backing into the flat tube; and forming the weld seam from an outside in one of the narrow sides.

5. The method according to claim 4, further comprising:

placing a solder foil around the inner insert, and wherein inserting the inner insert into the flat tube includes inserting the inner insert with the solder foil into the flat tube.

6. The method according to claims 1, wherein bending the at least two projections includes bending the at least two projections down by means of a tool after reshaping the blank.

7. The method according to claim 1, further comprising:

placing a solder foil around the inner insert, and wherein inserting the inner insert into the flat tube includes inserting the inner insert with the solder foil into the flat tube.

8. The method according to claim 1, wherein removing the at least two projections includes removing the projections with a lower tool that is introduced into an end of flat tube and cutting of the at least two projections with an externally acting cutting blade.

* * * * *

UNITED STATES PATENT AND TRADEMARK OFFICE
CERTIFICATE OF CORRECTION

PATENT NO. : 8,713,796 B2
APPLICATION NO. : 12/867893
DATED : May 6, 2014
INVENTOR(S) : Ingo Daut It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 874 days.

Signed and Sealed this

Twenty-ninth Day of September, 2015

Michelle K. Lee
*Director of the United States Patent and Trademark Office*